Oct. 3, 1950     O. H. SCHUCK     2,524,180
APPARATUS FOR DETERMINING THE DIRECTION
OF UNDERWATER TARGETS
Filed April 17, 1944     2 Sheets-Sheet 1

Inventor
OSCAR HUGO SCHUCK
By Murray O. Hayes
Attorney

Oct. 3, 1950

O. H. SCHUCK 2,524,180

APPARATUS FOR DETERMINING THE DIRECTION
OF UNDERWATER TARGETS

Filed April 17, 1944

2 Sheets-Sheet 2

Inventor
OSCAR HUGO SCHUCK.
Murray O. Hayes
By
Attorney

Patented Oct. 3, 1950

2,524,180

UNITED STATES PATENT OFFICE 2,524,180

APPARATUS FOR DETERMINING THE DIRECTION OF UNDERWATER TARGETS

Oscar Hugo Schuck, Belmont, Mass., assignor to the United States of America as represented by the Secretary of the Navy Application April 17, 1944, Serial No. 531,490

3 Claims. (Cl. 177—386)

This invention relates to apparatus for determining the direction of origin of radiated energy and is particularly directed, although not limited, to the determination of the direction of a source of compressional wave energy arising either directly or as an echo of a transmitted sound.

The invention is of especial utility in underwater sound echo ranging and is described in this connection in the following specification. However, it should be expressly understood that it is equally applicable in conjunction with other forms of wave energy.

The primary object of the invention is to provide means to determine the direction of a source of radiated wave energy with a high degree of accuracy and to indicate the direction of the source with respect to the point of observation simply and efficiently.

Another object of the invention is to provide means for ascertaining the direction of origin of radiated wave energy by simultaneously establishing electrically a plurality of overlapped directional lobes of sensitivity in an array of wave receiving elements in which each lobe is determined by the combined response of more than one element of the array.

Still another object of the invention is to provide means to use simultaneously, by comparison, the outputs of a plurality of wave responsive elements connected to form overlapping directional lobes of sensitivity to give an indication of the direction of a source of radiated energy with greatly increased accuracy.

Figure 1:
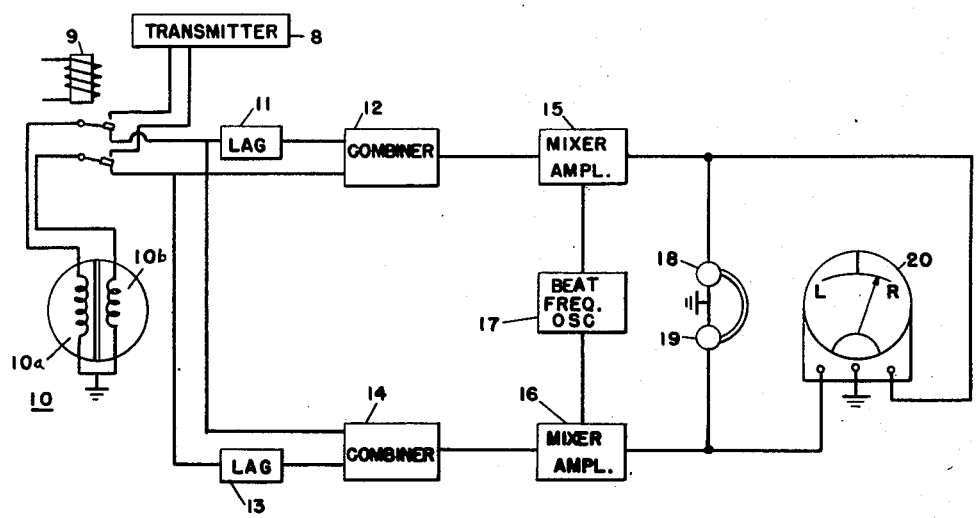
Figure 3:
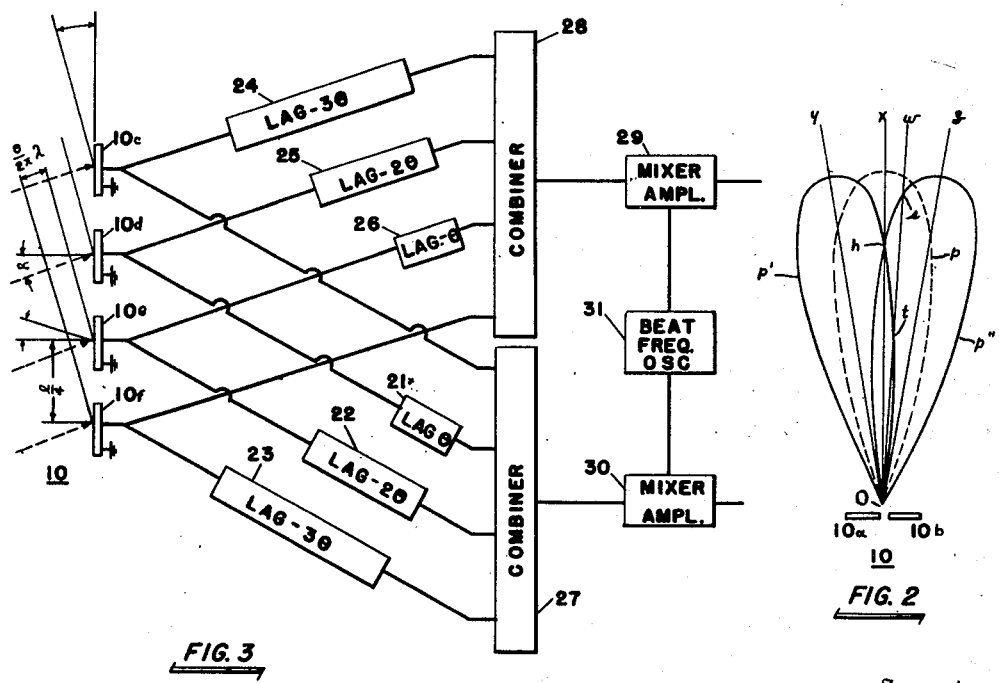
Figure 2:
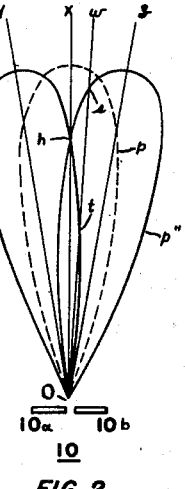
Figure 4:
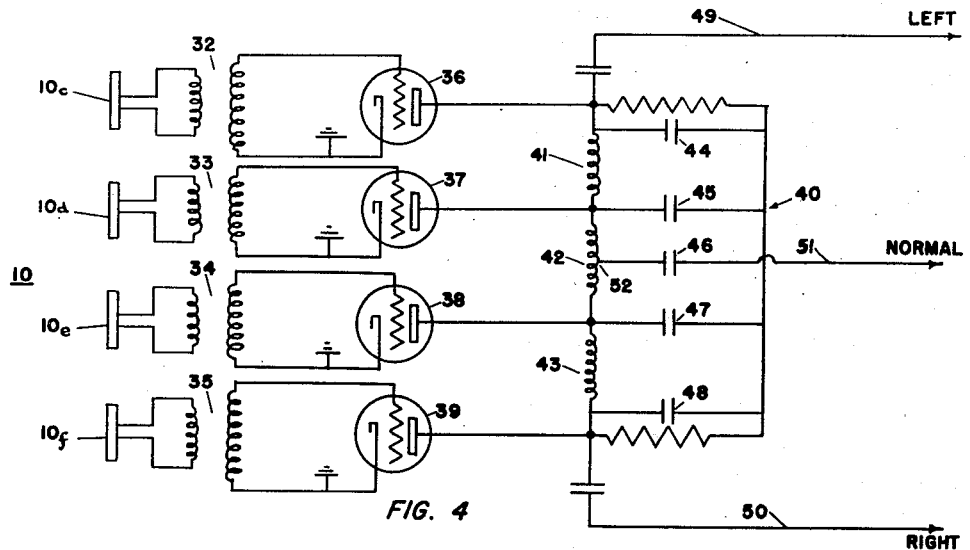
Figure 5:
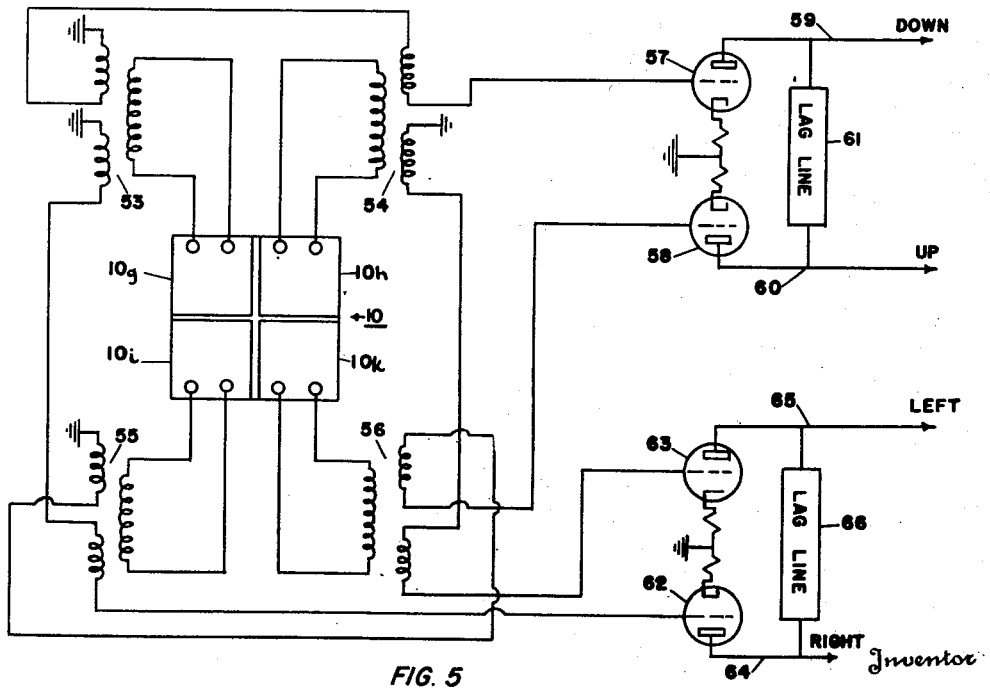

Other objects of the invention will become apparent from the following specification read in connection with the accompanying drawings in which Fig. 1 is a diagram illustrating one form of the invention in which the wave responsive device is divided into two vertical segments; Fig. 2 is a representation of two overlapped directional lobes of sensitivity produced by the arrangement of Fig. 1; Fig. 3 is a view of another form of the invention in which the elements of a transducer or wave responsive device are split vertically into four parts; Fig. 4 is a view of an array similar to that shown in Fig. 3 but in which common phase shifting elements are used for both output channels; and Fig. 5 is a view of a further form of the invention in which the directivity pattern may be shifted up or down and left or right.

As previously noted, the invention is applicable to other types of wave energy than underwater sounds, but the following description is predicated on this specific application of the invention. In present apparatus of this type intermittent pulses of wave energy, usually of supersonic frequency, are projected from a transducer which may be of the magnetostrictive or piezoelectric type carried by a vessel below the water line. The design characteristics of the transducer are such that the energy is projected therefrom in a relatively narrow beam.

When a pulse of wave energy strikes an underwater target, it is reflected and a portion of the reflected energy reaches the transducer (acting now as a receiver) to actuate a visual or aural indicator in the receiving apparatus. Target bearing is determined by the operator by ascertaining the direction which the transducer faces when the echo intensity is a maximum since this point is reached when the transducer is trained directly on the target. Since the speed of supersonic energy in water is known, the range of the target may be calculated from the time required for the pulse of energy to reach the target and return to the transducer. The transducer is usually mounted for rotation in azimuth and the operator is thus able to search an underwater area for a target, such as a submarine, throughout a complete circle of azimuthal bearing.

With transducers of the type in use at the present time, the directivity pattern on reception has the form of a lobe whose sensitivity changes relatively slowly in the region of maximum sensitivity. Because of this, it is difficult to fix the exact bearing at which the reflected pulse echo is received at a maximum strength, such bearings representing the bearing of the target, particularly if the transmission constant of the water changes from pulse to pulse.

In view of this difficulty the present technique employed by sound operators to obtain a target bearing is to train the transducer to one side until the echo is lost on that side of the target, then to the other side until the echo is similarly lost. Noting the echo drop-off bearings for both the right and left swings of the transducer, the correct bearing of the target is taken as the mean between the two. This "cut-on" procedure takes considerable time and one of the advantages of the present invention is that the bearing of an underwater target may be ascertained with greatly increased accuracy in a reduced time.

According to the present invention as applied to underwater sound echo ranging, intermittent pulses of wave energy preferably of supersonic frequency, are projected from the transducer as described above. In receiving the echo, however, the magnetostrictive or piezoelectric elements of the transducer, acting as a receiver, are divided into groups, and connections are established between the groups to form a plurality of receiving channels, each deriving its signal from more than one group of elements and each representing a different directivity of the array constituted by the groups.

For the purposes of the present disclosure the simplest form will be examined in which the transducer elements may be either the piezoelectric or magnetostrictive type of conventional construction and are connected to act together when transmitting a pulse of supersonic wave energy and split vertically into two similar parts on reception.

The dimensions of the transducer relative to the selected wave length of the energy pulse are such that the pulse is projected normal to the face of the transducer along axis $Ox$ and its transmitting pattern has a single relatively sharp major lobe such as is indicated at $p$ in Fig. 2 with its maximum in a plane normal to the face of the projector.

In accordance with the simple form of the present invention, energy pulses of supersonic frequency from a transmitter 8 are projected intermittently into the water from a transducer 10 by means of an intermittently operated send-receive relay 9. During the projection of the energy pulse, it is seen that all of the elements of the transducer 10 are connected to act simultaneously. However, when each energy pulse is terminated by opening of relay 9, it is seen that the transducer elements are divided along a vertical line into two parts, by bringing out the electrical connections for halves 10a and 10b separately. The transducer is then ready to receive an echo of the pulse.

When an echo strikes the face of the transducer the resulting mechanical vibrations of the sensitive elements thereof generate electromotive forces therein. The voltages generated in the elements comprising transducer half 10a are combined and fed through an electrical phase shifting network 11, which in the present instance constitutes a lag line, into a combiner 12. In addition the voltage output from transducer half 10b is fed directly into the combiner 12 without any phase shift.

The electrical effect of this in the output of the combiner 12 corresponds to, or is equivalent to, a shift in the direction sensitivity pattern away from the axis $Ox$ normal to the face of the transducer 10 to axis $Oy$ as shown in Fig. 2, the pattern now being designated by $p'$, and the receiving channel from combiner 12 represents a left shifted directivity of the array.

Similarly, the electrical output from transducer half 10b with a phase shift introduced by lag line 13 and the direct electrical output from transducer half 10a are fed into combiner 14. The effect of this in the output from combiner 14 corresponds to a shift in the direction sensitivity pattern $p$ in the opposite direction to axis $Oz$, the pattern now being designated by $p''$ and, with the proper choice of phase shifting elements this right shifted pattern overlaps pattern $p'$.

The lag lines are of any suitable construction consisting of capacitative and inductive reactances connected together to give the same amount of phase lag to each of the outputs from the transducer halves 10a and 10b. Since in the formation of two output channels it is only necessary to give the same phase shift to each half, the same lag elements may be used across the transducer.

The combiners 12 and 14 may be conventional electronic devices with their anode circuits connected in parallel to produce an instantaneous output quantity which is the sum of two input quantities from the transducer halves 10a and 10b at any instant. Obviously any suitable combining device may be substituted.

If supersonic frequencies are used, the outputs from combiners 12 and 14 are fed into mixer-amplifier devices 15 and 16 respectively where they are mixed with the output from a beat frequency oscillator 17 to produce audio frequency outputs in the two channels. However, if meter indication is used so that audio signals are not required the step of beating down the frequency from the combiners 12 and 14 may be dispensed with.

The outputs in each of the two output channels will vary depending on the direction of the echo pulse relative to the mid-plane of the transducer face. If the echo pulse returns to the face of the transducer along axis $Ox$, it is seen from the patterns in Fig. 2 that the amplitude of the echo pulse in both channels will be equal, being represented by the vector $Oh$. However, if the echo pulse returns along some other axis such as $Ow$, its amplitude in the right shifted output channel represented by pattern $p''$, will be at a level indicated by vector $Os$ while its amplitude in the left shifted output channel represented by pattern $p'$ will be at a level indicated by vector $Ot$. A comparison of the relative amplitudes of the outputs in the two channels indicates whether the echo pulse is returning to the transducer face from the left or from the right of the perpendicular thereto, or along the perpendicular. Of course, in actual operation, once an underwater target has been picked up, the operator endeavors so to train his transducer that the signal amplitudes in both output channels are always equal, in which event, the bearing of the target is along the axis $Ox$, normal to the face of the transducer.

The comparison of the outputs in the two channels representing the two directivities of the transducer elements may be made binaurally in receivers 18, 19, or visually by a left-right indicator 20 which is of conventional design and hence has been illustrated only diagrammatically.

In the arrangement described from Fig. 1, the elements of the transducer were divided vertically into two halves. Such a division, with the necessary phase shift, may introduce objectionable minor lobes in the directivity pattern. If the height of the minor lobes gives rise to inaccurate indications, the arrangement shown in Fig. 3 may be employed to reduce them. In the arrangement there shown the overall receiving pattern is smoothed by making the vertical divisions of the transducer elements into four parts 10c, 10d, 10e and 10f. In most instances, however, such a multiple division may be found unnecessary.

In order to shift the axis of the directivity pattern through an angle $\alpha$ to one side of the transducer face it is necessary to introduce a phase shift difference of $\theta$ between the outputs of adjacent sections of the transducer before combining them, where $$\theta = \frac{2\pi}{\lambda} \frac{l}{4} \sin \alpha$$

$\lambda$ being the wave length of the echo, and $$\frac{l}{4}$$

the distance between the center of adjacent sections of the transducer as shown in Fig. 3.

As indicated in Fig. 3 the "right" and "left" channels formed by combiners 27 and 28 each derives its signal from all of the transducer elements. In the case of combiner 27 the output from the section 10c of the transducer is taken directly, that from 10d is lagged through an angle θ, that from 10e is lagged through an angle 2θ, and that from 10f is lagged through an angle 3θ. For combiner 28 the output of 10f is taken directly, the output from 10e is lagged through an angle θ, from 10d through 2θ, and from 10c through 3θ. The phase lags of θ, 2θ and 3θ are produced by conventional delay networks represented diagrammatically in block form at 21 to 26 in Fig. 3. The combining circuits which are also shown in block form for 27 and 28 may comprise electronic amplifiers, the control grid of each amplifier being connected to a separate input and the anode circuits of all circuits paralleled to feed a common output. Other forms of combining circuits may be utilized such as circuits with isolating resistors feeding a common load, or with transformers having their secondaries connected in series.

Phase shifting elements 21, 22 and 23 produce, as indicated in Fig. 3, a left-shifted directivity and, by similar means a right-shifted directivity may be produced by phase shifting devices 24, 25 and 26 working into combiner 28. The net result of the two shifts a and a' is to produce overlapping direction sensitivity patterns as shown in Fig. 2.

If desired, the outputs from the combiners 27 and 28 may be fed into mixers 29 and 30, beat with the output of oscillator 31, amplified and compared in the same manner as in Fig. 1.

While the sections 10c, 10d, 10e and 10f of the transducer have been indicated as equal divisions, it is obvious that conventional shading techniques may be employed to reduce minor lobes still further.

In Fig. 4 there is shown an arrangement which produces substantially the same result as that shown in Fig. 3 but differs therefrom in that a single phase shifting network is employed which is common to both output channels. In this form the transducer is split vertically into four sections, 10c, 10d, 10e and 10f as was the case in Fig. 3. The respective outputs from these transducer sections are taken through transformers 32, 33, 34 and 35, the secondaries of which connect with the control grids of tubes 36, 37, 38 and 39. The anode circuits of these tubes are all connected in parallel to the common lag line 40 consisting of series connected inductances 41, 42 and 43 and shunt connected capacitances 44, 45, 46, 47 and 48.

The left shifted output channel 49 thus takes its signal directly from 10c and its output from the remaining transducer sections with the progressively increasing phase shift as previously explained. Similarly, the right shifted directivity channel 50 takes its signal directly from transducer section 10f and receives progressively shifted outputs from the remaining sections.

The outputs in channels 49 and 50 may be compared either binaurally or visually as in Fig. 1 to indicate the direction of the incoming echo. If it is desired to utilize the transducer for the purpose of listening to noise or to otherwise dispense with the simultaneous comparison of the two shifted patterns a third channel 51 from a center tap 52 on the lag line may be used which derives its output from the transducer sections symmetrically and thus corresponds to pattern p indicated in dotted lines in Fig. 2.

Lag lines 11 and 13 in Fig. 1 may be replaced by a common lag line in much the same manner as disclosed in Fig. 4 thus reducing the number of parts required in the system.

The arrangements previously described give rise to a simultaneous comparison of two directivities in azimuth and the same technique may be employed in depth determinations either separately or concurrently with the azimuth determination. Such an arrangement is shown in Fig. 5.

Referring now to Fig. 5, the transducer 10 is divided into four equal quadrants 10g, 10h, 10i and 10k for receiving energy. The electrical outputs from quadrants 10g and 10h feed the primary windings of transformers 53 and 54 respectively. Similarly, quadrants 10i and 10k feed the primaries of transformers 55 and 56.

All four of these transformers have split secondary windings. The top secondary of transformer 53 is connected in series with the top secondary of transformer 54 and the latter is connected to the grid of amplifier 57. Similarly the top secondary of transformer 55 is connected in series with the top secondary of transformer 56 and the latter is connected to the grid of amplifier 58. Thus the outputs from the upper quadrants 10g and 10h combine and feed into channel 59. Similarly the outputs from the lower quadrants 10i and 10k combine and feed into channel 60.

A lag line 61 is connected across the channels 59 and 60. Hence channel 59 will receive the outputs direct from the upper transducer quadrants 10g and 10h plus a phase shifted output from the lower two quadrants 10i and 10k through lag line 61, the result of which will be equivalent to a deflection of transducer 10 and hence its directivity pattern downwardly from the perpendicular to the transducer face. Simultaneously, channel 60 will receive the outputs direct from the lower transducer quadrants 10i and 10k plus a phase shifted output from the two upper quadrants 10g and 10h through lag line 61, the result of which will be equivalent to a deflection of transducer 10 and hence its directivity pattern upwardly from the perpendicular to the transducer face.

The bottom secondary of transformer 53 is connected in series with the bottom secondary of transformer 55 and the latter is connected to the grid of amplifier 62. Similarly the bottom secondary of transformer 54 is connected in series with the bottom secondary of transformer 56 and the latter is connected to the grid of amplifier 63. Thus the outputs from the left quadrants 10g and 10i combine and feed into channel 64. Similarly the outputs from the right quadrants 10h and 10k combine in channel 65.

A lag line 66 is connected across channels 64 and 65. Hence channel 65 will receive the outputs direct from the right quadrants 10h and 10k plus a phase shifted output from the two left quadrants 10g and 10i through lag line 66, the result of which will be to deflect the directivity pattern to the left of the perpendicular to the transducer face. Simultaneously channel 64 will receive the outputs direct from the left quadrants 10g and 10i plus a phase shifted output from the two right quadrants, 10h and 10k through lag line 66, the result of which will be to deflect the directivity pattern to the right from the perpendicular to the transducer face.

Thus by comparing the outputs in channels 59—60 and channels 64—65 by means which may be the same as that shown in Fig. 1, one may determine both the elevation and bearing of the received energy pulse relative to the perpendicular to the transducer face.

It should be expressly understood that the foregoing description concerns the preferred embodiments of the invention and that numerous changes may be made therein without departing from the spirit and scope of the invention as defined in the appended claims. For example, the phase shifting networks connected with the sectionalized transducer have been described as lag networks which act to retard the phase of the electrical quantities presented thereto. However, since it is only necessary to produce a relative shift in phase between the outputs of the several transducer sections, it is evident that lead networks to advance the phase of the electrical quantities produced in the transducer may be adapted as well as combinations of lead and lag sections. Further, while it is preferred to use a single transducer structure in which the elements are divided into a plurality of sections, it is evident that substantially the same result may be obtained with the use of separate transducers placed close enough so that overlapping directivity patterns may be created. As used herein, the term "transducer" is intended to include any device capable of translating wave energy, either sonic or radiant, to electrical energy and vice versa.

Having thus fully described this invention, what is claimed is:

1. Apparatus for determining the direction of a source of wave energy comprising a transducer assembly having its active face divided into two left side quadrants comprising down and up quadrants and two right side quadrants comprising down and up quadrants, each of said four quadrants comprising a separate directionally oriented transducer, said four quadrants when combined directly having a first sensitive lobe pattern with a first axis on a perpendicular to said active face; a first phase shifting and combining means connected in circuit with all of said four quadrants including means for combining a phase shifted output from said two right quadrants with an unshifted output from said two left quadrants corresponding to a lateral shift in said first axis to form a second pattern having its axis on one side of said perpendicular to produce a first output quantity, said first means including means simultaneously combining a phase shifted output from said two left quadrants with an unshifted output from said two right quadrants corresponding to a lateral shift in said first axis to form a third pattern having its axis on the side opposite to said one side of said perpendicular to produce a second output quantity, said second and third patterns being overlapped; said first means including means for combining a phase shifted output from said two up quadrants with an unshifted output from said two down quadrants corresponding to a vertical shift in said first axis to form a fourth pattern having its axis on one side of said perpendicular to produce a third output quantity; said first means including means for combining a phase shifted output from said two down quadrants with an unshifted output from said two up quadrants corresponding to a vertical shift in said first axis to form a fifth pattern having its axis on the side opposite to said last named one side of said perpendicular to produce a fourth output quantity; said fourth and fifth patterns being overlapped.

2. The combination in claim 1 and further including means for comparing said output quantities to determine elevation and bearing of a target.

3. The combination in claim 1, and further including means for comparing and indicating the relative amplitudes of said output quantities.

OSCAR HUGO SCHUCK.

REFERENCES CITED

The following references are of record in the file of this patent:

UNITED STATES PATENTS

| Number | Name | Date |
|---|---|---|
| 2,166,991 | Guanella | July 25, 1939 |
| 2,208,377 | Luck | July 16, 1940 |
| 2,251,708 | Hefele | Aug. 5, 1941 |